(12) United States Patent
Lee

(10) Patent No.: US 10,671,211 B2
(45) Date of Patent: Jun. 2, 2020

(54) TOUCH SENSING APPARATUS AND COMMON INPUT READ METHOD OF ARRAY SIGNAL

(71) Applicant: Shang-Li Lee, Keelung (TW)

(72) Inventor: Shang-Li Lee, Keelung (TW)

( * ) Notice: Subject to any disclaimer, the term of this patent is extended or adjusted under 35 U.S.C. 154(b) by 0 days.

(21) Appl. No.: 16/265,023

(22) Filed: Feb. 1, 2019

(65) Prior Publication Data

US 2019/0250758 A1 Aug. 15, 2019

(30) Foreign Application Priority Data

Feb. 14, 2018 (TW) ............................. 107105571 A

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
CPC ..... G06F 2200/1634; G06F 2200/0339; G06F 2200/04103; G06F 2200/04104; G06F 1/169–1692; G06F 1/1643; G06F 3/03547; G06F 3/041–0416; G06F 3/0488–04886

See application file for complete search history.

(56) References Cited

U.S. PATENT DOCUMENTS

| 2013/0076648 A1* | 3/2013 | Krah | ..................... G06F 3/0412 345/173 |
| 2015/0205427 A1* | 7/2015 | Wu | ........................ G06F 3/0416 345/174 |

* cited by examiner

*Primary Examiner* — Sanghyuk Park
(74) *Attorney, Agent, or Firm* — Hauptman Ham, LLP

(57) ABSTRACT

A common input read method of an array signal is applicable to a touch sensing apparatus using a drive signal having a characteristic of a continuous function (being differentiable) as a touch basis. The touch sensing apparatus includes a plurality of sensing electrodes and a plurality of drive electrodes. Any sensing electrode initially first undergoes a stabilization process till a signal becomes stable and indicates completion, an initially stabilized same sensing electrode is then read according to a selection order of the drive electrodes, and an initial stabilization action only needs to be performed when a sensing electrode that is not currently processed needs to be processed. In this way, the time it takes to enter a steady state is reduced, so that the sensing speed is further increased.

5 Claims, 3 Drawing Sheets

000
TOUCH SENSING APPARATUS AND COMMON INPUT READ METHOD OF ARRAY SIGNAL

CROSS-REFERENCE TO RELATED APPLICATION

This non-provisional application claims priority under 35 U.S.C. § 119(a) to Patent Application No. 107105571 in Taiwan, R.O.C. on Feb. 14, 2018, the entire contents of which are hereby incorporated by reference.

BACKGROUND

Technical Field

The present invention relates to a touch sensing apparatus and a common input read method of an array signal, which are applicable to a touch sensing apparatus using a drive signal having a characteristic of a continuous function (being differentiable) as a touch basis.

Related Art

Generally, a touch sensing apparatus includes a plurality of sensing electrodes and a plurality of drive electrodes. The touch sensing apparatus scans a sensing electrode and a drive electrode and reads a touch sensing signal via the sensing electrode. In a common scanning manner, a specific functional voltage (for example, a square wave, a sine wave or a pulse) is supplied to any drive electrode, and the sensing electrodes are then sequentially charged and discharged, so as to respectively measure capacitance values (equivalent to touch sensing signals) of the sensing electrodes relative to the drive electrode. When a voltage starts to be applied to a position in one circuit, a stabilization process is indispensable. This situation occurs when a jump is needed for the control of drive and sensing positions in an array column sensing mechanism. However, if such stabilization operations are frequently performed, time consumption and energy consumption are obvious problems.

The time of scanning a sensing electrode and a drive electrode affects the efficiency of reading a touch sensing signal by a touch sensing apparatus. Therefore, a touch sensing apparatus and a method for sensing a touch sensing signal are needed, so as to efficiently read a touch sensing signal and improve the touch efficiency performance of the touch sensing apparatus.

SUMMARY

In view of the foregoing problem, the present invention provides a touch sensing apparatus and a common input read method of an array signal, which are applicable to the touch sensing apparatus using a drive signal having a characteristic of a continuous function (being differentiable) as a touch basis. The drive signal having a characteristic of a continuous function (being differentiable) may be a voltage change, a current change, a frequency change or a combined signal thereof.

In an embodiment, a common input read method of an array signal includes: initially stabilizing a first sensing electrode within a first period, performing a first scanning operation within the first period, initially stabilizing a second sensing electrode within a second period after the first period, and performing a second scanning operation within the second period. The performing step of the first scanning operation includes: driving a first drive electrode within a first operation time of the first period, and measuring a capacitance value of the first sensing electrode corresponding to the driven first drive electrode by using the initially stabilized first sensing electrode, driving a second drive electrode within a second operation time of the first period, and measuring a capacitance value of the first sensing electrode corresponding to the driven second drive electrode by using the initially stabilized first sensing electrode. The performing step of the second scanning operation includes: driving the first drive electrode within a first operation time of the second period, measuring a capacitance value of the second sensing electrode corresponding to the driven first drive electrode by using the initially stabilized second sensing electrode, driving the second drive electrode within a second operation time of the second period, and measuring a capacitance value of the second sensing electrode corresponding to the driven second drive electrode by using the initially stabilized second sensing electrode.

In an embodiment, a touch sensing apparatus includes a first sensing electrode, a second sensing electrode, a first drive electrode, a second drive electrode, and a signal processing circuit. The signal processing circuit is coupled to the first sensing electrode, the second sensing electrode, the first drive electrode, and the second drive electrode. The signal processing circuit is configured to perform: driving the first drive electrode within a first operation time of a first period by using a drive signal having a characteristic of a continuous function, measuring a capacitance value of the first sensing electrode corresponding to the driven first drive electrode by using the initially stabilized first sensing electrode, and driving the second drive electrode within a second operation time of the first period by using the drive signal having a characteristic of a continuous function, and measuring a capacitance value of the first sensing electrode corresponding to the driven second drive electrode by using the initially stabilized first sensing electrode. The performing step of the first scanning operation includes: driving a first drive electrode within a first operation time of the first period, and measuring a capacitance value of the first sensing electrode corresponding to the driven first drive electrode by using the initially stabilized first sensing electrode, driving a second drive electrode within a second operation time of the first period, and measuring a capacitance value of the first sensing electrode corresponding to the driven second drive electrode by using the initially stabilized first sensing electrode. The performing the second scanning operation includes: driving the first drive electrode within a first operation time of a second period by using the drive signal having a characteristic of a continuous function, measuring a capacitance value of the first sensing electrode corresponding to the driven first drive electrode by using the initially stabilized first sensing electrode, driving the second drive electrode within a second operation time of the second period by using the drive signal having a characteristic of a continuous function, and measuring a capacitance value of the first sensing electrode corresponding to the driven second drive electrode by using the initially stabilized first sensing electrode.

In conclusion, by using the touch sensing apparatus and the common input read method of an array signal according to the embodiments of the present invention, the time it takes to enter a steady state is reduced, so that the sensing speed is further increased, thereby improving the touch efficiency performance of the touch sensing apparatus.

BRIEF DESCRIPTION OF THE DRAWINGS

The present invention will become more fully understood from the detailed description given herein below for illustration only, and thus are not limitative of the present invention, and wherein.

DETAILED DESCRIPTION

First, a common input read method of an array signal according to any embodiment of the present invention is applicable to a touch sensing apparatus using a drive signal having a characteristic of a continuous function (being differentiable) as a touch basis. The touch sensing apparatus is, for example, but is not limited to, a touch panel, an electronic drawing board, and a graphic tablet. In some embodiments, the touch sensing apparatus may further be integrated with a display to form a touch screen. Moreover, the touch sensing apparatus may be touched by using a touch component such as a hand, a stylus or a touch brush. In some embodiments, the drive signal may be a voltage change, a current change, a frequency change or a combined signal thereof.

Figure 1:
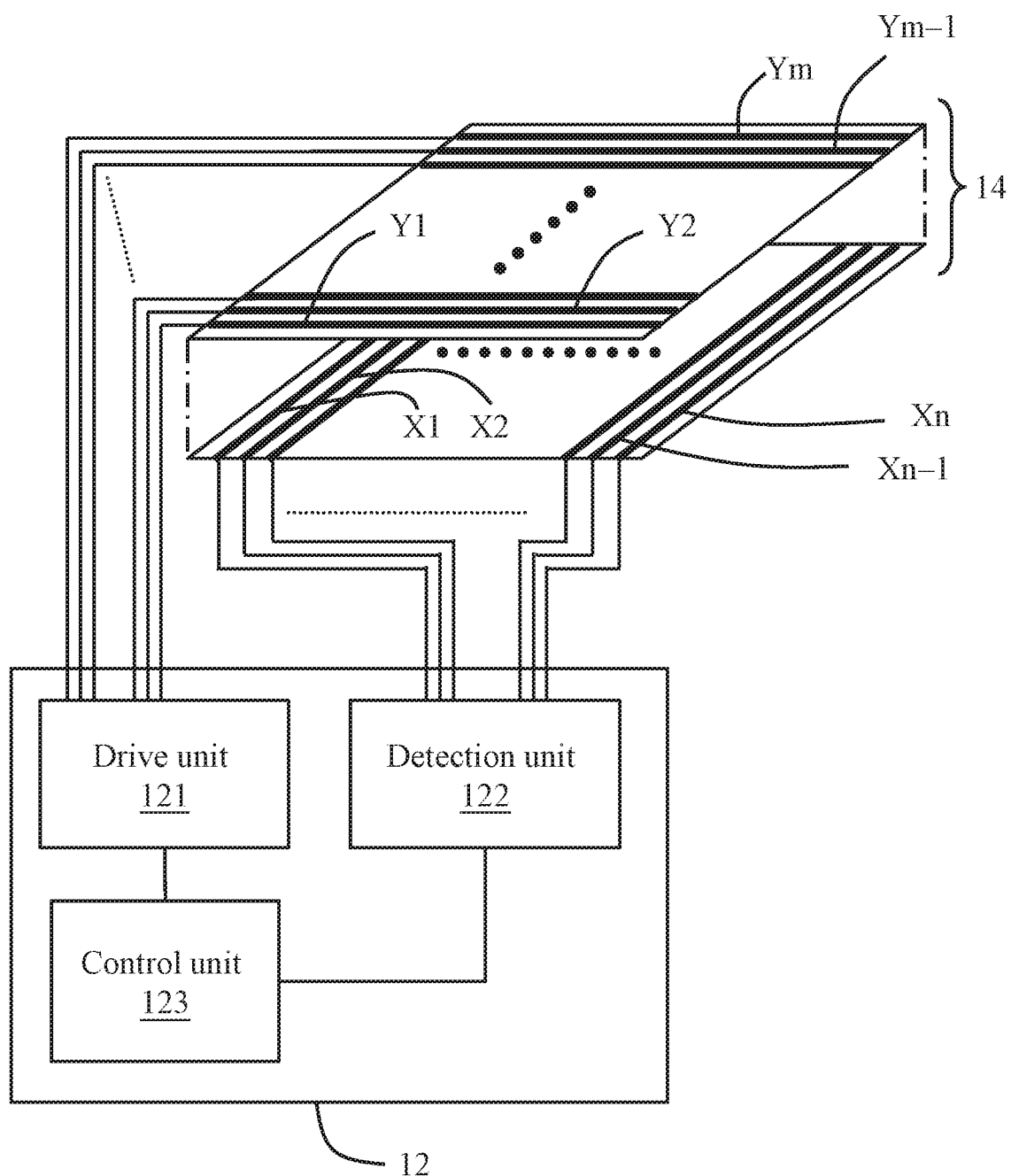
FIG. 1 is a schematic diagram of a touch sensing apparatus to which any embodiment of the present invention is applied.
Figure 2:
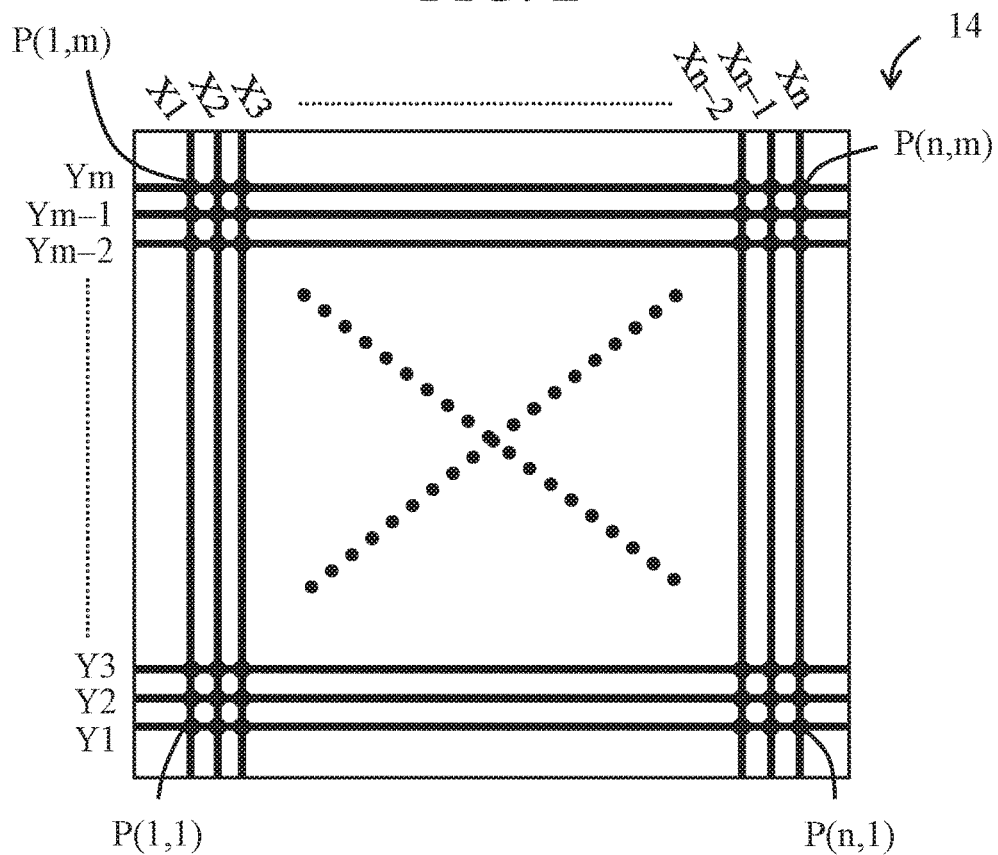
FIG. 2 is a schematic diagram of an example of a signal sensor in FIG. 1.

FIG. 1 is a schematic diagram of a touch sensing apparatus to which any embodiment of the present invention is applied. FIG. 2 is a schematic diagram of an embodiment of a signal sensor in FIG. 1.

Referring to FIG. 1, the touch sensing apparatus includes a signal processing circuit 12 and a signal sensor 14. The signal sensor 14 is connected to the signal processing circuit 12. The signal sensor 14 includes a plurality of electrodes (for example, drive electrodes X1 to Xn and sensing electrodes Y1 to Ym) that are arranged intersecting with each other, where n and m are positive integers, and n may be equal to m or unequal to m.

As seen from the top, the drive electrodes X1 to Xn and the sensing electrodes Y1 to Ym intersect with each other, and define a plurality of sensing points P(1, 1) to P(n, m) that are arranged in a matrix, as shown in FIG. 2. In some embodiments, as seen from the top, the intersecting drive electrodes X1 to Xn and sensing electrodes Y1 to Ym have a rhombic beehive form, a mesh form or a grid form. In some embodiments, the drive electrodes X1 to Xn and the sensing electrodes Y1 to Ym may be located in different planes (located on different sensing layers). An insulating layer (not shown in the figure) may be sandwiched between the different planes, but the present invention is not limited thereto. In some other embodiments, the drive electrodes X1 to Xn and the sensing electrodes Y1 to Ym may alternatively be located in a same plane, that is, are located on a single sensing layer.

In some embodiments, the signal sensor 14 may use a transparent or translucent design. Therefore, when the signal sensor 14 is combined with a display, a user can see through the signal sensor 14 content displayed by the display. In some other embodiments, the signal sensor 14 may alternatively not use a transparent or translucent design, for example, a signal sensor 14 in a touch apparatus such as an electronic drawing board or a graphic tablet that does not have a display.

Figure 3:
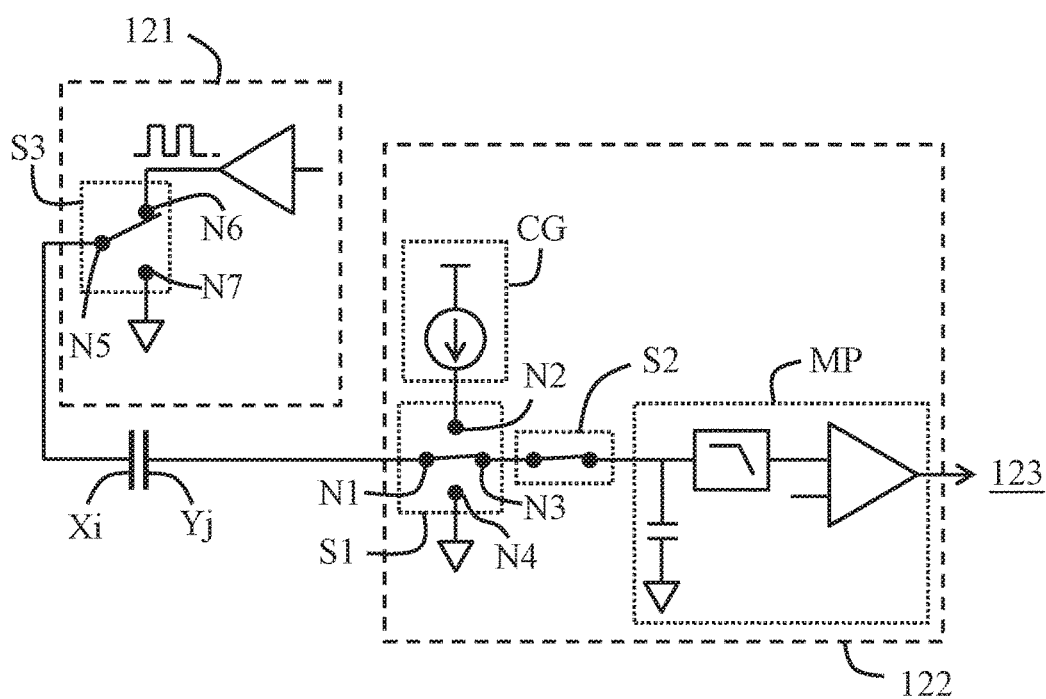
FIG. 3 is a schematic circuit diagram of an example of touch detection of one sensing point in the touch sensing apparatus in FIG. 1.

The signal processing circuit 12 includes a drive unit 121, a detection unit 122, and a control unit 123. The control unit 123 is coupled to the drive unit 121 and the detection unit 122. Here, the drive unit 121 and the detection unit 122 may be integrated into a single component, or may be implemented by two components, depending on a situation during design. Referring to FIG. 3, the drive unit 121 is configured to output the drive signal having a characteristic of a continuous function (being differentiable) to a drive electrode Xi (one of X1 to Xn) to be driven. The detection unit 122 is configured to measure a capacitance value of an initially stabilized sensing electrode Yj (one of Y1 to Ym) corresponding to the driven drive electrode Xi, where i is any one of 1 to n, and j is any one of 1 to m. Here, the control unit 123 can be configured to control the operation of the drive unit 121 and the detection unit 122 and determine a capacitance value change of each sensing point according to a background signal (a determined capacitance value without a touch) and a sensing signal (a capacitance value about whether a touch to be detected occurs).

Here, the touch sensing apparatus can perform touch detection of sensing points P(1, 1) to P(n, m) by performing a common input read method of an array signal according to any embodiment of the present invention, so as to reduce the time needed for the compatibility and/or stabilization of a switch and the sensing points P(1, 1) to P(n, m), so that the sensing speed is further increased, thereby improving the touch efficiency performance of the touch sensing apparatus.

Figure 4:
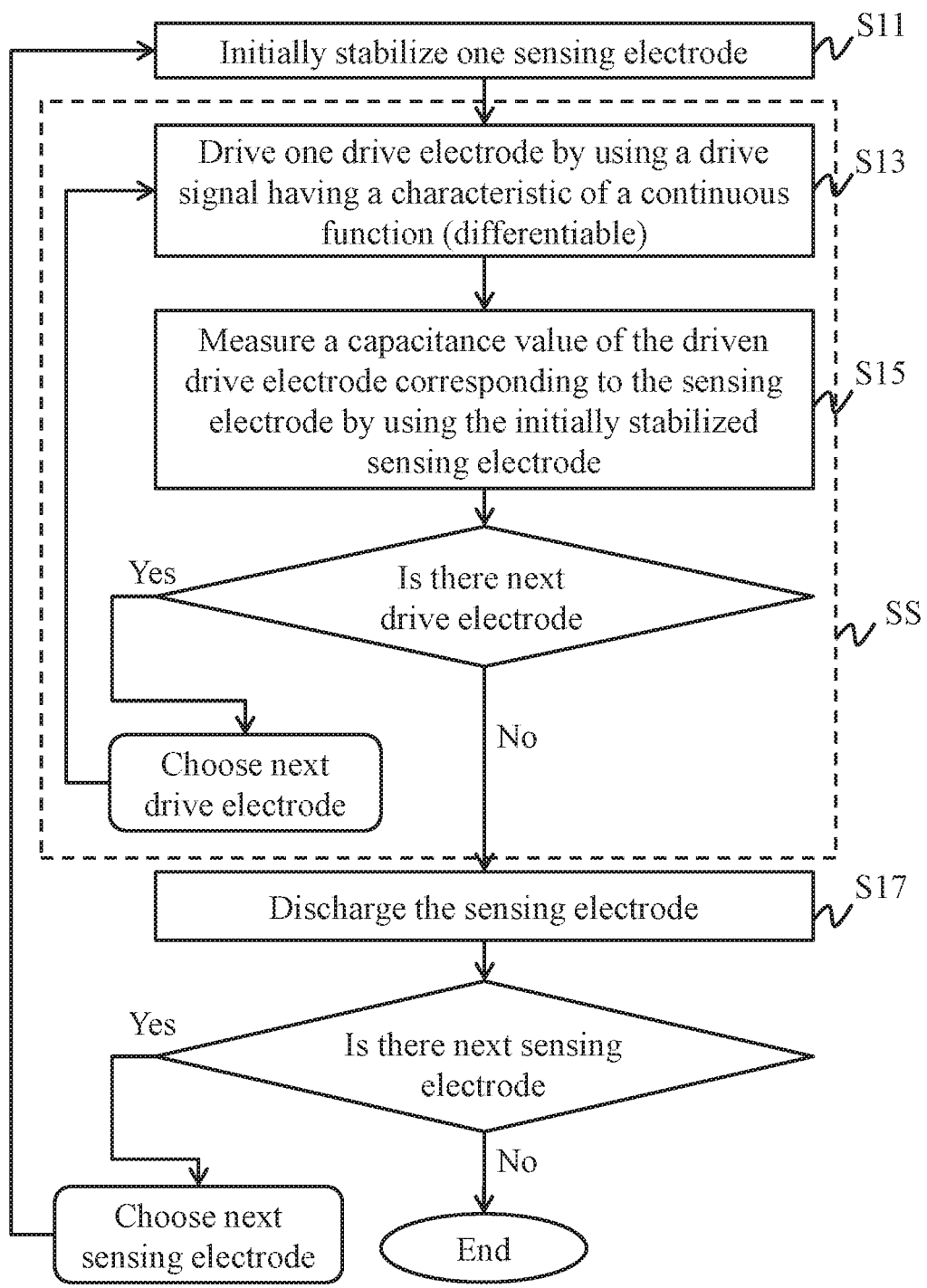
FIG. 4 is a flowchart of a common input read method of an array signal according to an embodiment of the present invention.

FIG. 4 is a flowchart of a common input read method of an array signal according to an embodiment of the present invention.

Referring to FIG. 1 to FIG. 4, in some embodiments, during touch sensing, a control unit 123 controls a detection unit 122 to initially stabilize one sensing electrode Yj (Step S11). In an implementation aspect of Step S11, the detection unit 122 charges the sensing electrode Yj to a first voltage (switched to a charging state), and keeps the other sensing electrodes Y1 to Yj−1 and Yj+1 to Ym floating (switched to a floating state). When the potential of the sensing electrode Yj becomes stable (is kept at the first voltage), the sensing electrode Yj completes initial stabilization. For example, in Step S11, a switch S1 coupled to the sensing electrode Yj in the detection unit 122 turns on contacts N1 and N2, to enable the sensing electrode Yj to turn on a charging source CG. In this case, the charging source CG starts to charge the sensing electrode Yj until a signal becomes stable and indicates that initial stabilization is completed. During initial stabilization of the sensing electrode Yj, switches Si coupled to the other sensing electrodes Y1 to Yj−1 and Yj+1 to Ym in the detection unit 122 turn on contacts N1 and N3 and switches S2 corresponding to the other sensing electrodes Y1 to Yj−1 and Yj+1 to Ym are opened, to keep the other sensing electrodes Y1 to Yj−1 and Yj+1 to Ym in a floating state.

Next, the control unit 123 performs a scanning operation SS based on the initially stabilized sensing electrode Yj. In other words, after initial stabilization of the sensing electrode Yj is completed, the control unit 123 controls a drive unit 121 to drive a first drive electrode X1 by using a drive signal having a characteristic of a continuous function (being differentiable) (Step S13), and after the drive electrode X1 is stably driven, controls the detection unit 122 to measure a capacitance value of a sensing capacitor (that is, a sensing point P(1, j)) formed of the driven drive electrode X1 and the initially stabilized sensing electrode Yj by using the initially stabilized sensing electrode Yj (Step S15). After the capacitance value of the sensing point P(1, j) is measured, the control unit 123 controls the drive unit 121 to be switched to drive a next drive electrode X2 by using the drive signal having a characteristic of a continuous function (being differentiable) (Step S13). After the drive electrode X2 is stably driven, the control unit 123 controls the detection unit 122 to perform measurement on the initially stabilized sensing electrode Yj, that is, measure a capacitance value of a sensing capacitor (that is, a sensing point P(2, j)) formed of the driven drive electrode X2 and the initially stabilized sensing electrode Yj by using the initially stabilized sensing electrode Yj (Step S15). This process is repeated until all the drive electrodes X1 to Xn have been driven and a capacitance value of each drive electrode Xi corresponding to the sensing electrode Yj has been measured. In this case, the control unit 123 can obtain capacitance values of n sensing points P(1, j) to P(n, j).

For example, a capacitance value of a sensing point P(i, j) is measured. In Step S13, a switch S3 coupled to the drive electrode Xi in the drive unit 121 turns on contacts N5 and N6, and the corresponding switch S3 is used to input the drive signal to the drive electrode Xi. In this case, switches S3 coupled to the other drive electrodes X1 to Xi−1 and Xi+1 to Xn are in a floating state. After a signal of the drive electrode Xi becomes stable, the switch S1 coupled to the sensing electrode Yj in the detection unit 122 turns on contacts N1 and N3 and the corresponding switch S2 to turn on a measurement circuit MP, to read a capacitance value of a sensing capacitor (that is, the sensing point P(i, j)) of the sensing electrode Yj corresponding to the drive electrode Xi. In this case, the other sensing electrodes Y1 to Yj−1 and Yj+1 to Ym are kept in a floating state. After the capacitance value of the sensing point P(i, j) has been measured, the switch S3 coupled to the drive electrode Xi in the drive unit 121 turns on contacts N5 and N7, to discharge the drive electrode Xi. After the drive electrode Xi has been discharged, a switch S3 coupled to a drive electrode Xi+1 in the drive unit 121 turns on contacts N5 and N6, and the corresponding switch S3 is used to input the drive signal to the drive electrode Xi+1. In this case, switches S3 coupled to the other drive electrodes X1 to Xi and Xi+2 to Xn are in a floating state. After a signal of the drive electrode Xi+1 becomes stable, the switch S1 coupled to the sensing electrode Yj in the detection unit 122 turns on the contacts N1 and N3 and the corresponding switch S2 to turn on the measurement circuit MP, to read a capacitance value of a sensing capacitor (that is, a sensing point P(i+1, j)) of the sensing electrode Yj corresponding to the drive electrode Xi+1. In this case, the other sensing electrodes Y1 to Yj−1 and Yj+1 to Ym are still kept in a floating state. After the capacitance value of the sensing point P(i+1, j) has been measured, the switch S3 coupled to the drive electrode Xi+1 in the drive unit 121 turns on contacts N5 and N7, to discharge the drive electrode Xi+1. After the drive electrode Xi has been discharged, a next drive electrode Xi+2 continues to be driven in the same manner, to further measure a capacitance value of a sensing capacitor (that is, a sensing point P(i+2, j)) of the sensing electrode Yj corresponding to the drive electrode Xi+2. This process is repeated until a capacitance value of a sensing point P(n, j) has been measured, and the capacitance values of the n sensing points P(1, j) to P(n, j) are obtained.

Then, the control unit 123 controls the detection unit 122 to discharge the sensing electrode Yj that has undergone measurement (Step S17). For example, in Step S17, the switch S1 coupled to the sensing electrode Yj in the detection unit 122 turns on the contacts N1 and N4, so that the sensing electrode Yj is discharged to ground. In this case, the other sensing electrodes Y1 to Yj−1 and Yj+1 to Ym are in a floating state (for example, the corresponding switches S1 turn on the contacts N1 and N3 and the corresponding switches S2 are opened).

After the sensing electrode Yj has been discharged, the control unit 123 controls the detection unit 122 to continue to initially stabilize a next sensing electrode Yj+1 (Step S11). After initial stabilization is completed, the control unit 123 performs a scanning operation SS based on the initially stabilized sensing electrode Yj+1. That is, the control unit 123 controls the drive unit 121 to sequentially drive the drive electrodes X1 to Xn by using the drive signal having a characteristic of a continuous function (being differentiable), and after each drive electrode Xi is stably driven, controls the detection unit 122 to measure a capacitance value of the driven drive electrode and the initially stabilized sensing electrode Yj+1 by using the initially stabilized sensing electrode Yj+1 (Step S15). Therefore, capacitance values of n sensing points P(1, j+1) to P(n, j+1) are obtained. Then, the control unit 123 controls the detection unit 122 to discharge the sensing electrode Yj+1 that has undergone measurement (Step S17).

In this way, initial stabilization of a sensing electrode and a scanning operation SS based on the initially stabilized sensing electrode are performed repeatedly, until all the sensing electrodes have been initially stabilized and undergone measurement, thereby obtaining capacitance values (an array signal) of all the sensing points P(1, 1) to P(n, m).

For example, under the control of the control unit 123, the detection unit 122 charges a first sensing electrode Y1 to a first voltage, and keeps a voltage of the first sensing electrode Y1 at the first voltage within a first period. In this case, the other sensing electrodes Y2 to Ym is in a floating state.

Moreover, within the first period, the control unit 123 performs a scanning operation (referred to as a first scanning operation below) based on the first sensing electrode Y1 having the first voltage.

In the process of performing the first scanning operation, that is, within a first operation time of the first period, the drive unit 121 transfers the drive signal having a characteristic of a continuous function (being differentiable) to a first drive electrode X1, and the detection unit 122 reads a capacitance value of the first drive electrode X1 corresponding to the first sensing electrode Y1 by using the first sensing electrode Y1. Here, after the drive signal having a characteristic of a continuous function (being differentiable) starts to be supplied to the first drive electrode X1, the detection unit 122 starts measurement after waiting a stabilization time. In some embodiments, when the first drive electrode X1 is driven, the drive unit 121 does not drive the other drive electrodes X2 to Xn (does not supply the drive signal having a characteristic of a continuous function (being differentiable)).

Further, within a second operation time of the first period, the drive unit 121 is switched to transfer the drive signal having a characteristic of a continuous function (being differentiable) to a second drive electrode X2, and the detection unit 122 measures a capacitance value of the second drive electrode X2 corresponding to the first sensing electrode Y1 by using the first sensing electrode Y1. Here, after the drive signal having a characteristic of a continuous function (being differentiable) starts to be supplied to the second drive electrode X2, the detection unit 122 starts measurement after waiting a stabilization time. In the first period, the first operation time and the second operation time do not overlap with each other. In some embodiments, when the second drive electrode X2 is driven, the drive unit 121 does not drive the other drive electrodes X1 and X3 to Xn (does not supply the drive signal having a characteristic of a continuous function (being differentiable)).

Furthermore, within a third operation time of the first period, the drive unit 121 transfers the drive signal having a characteristic of a continuous function (being differentiable) to a third drive electrode X3), and the detection unit 122 measures a capacitance value of the third drive electrode X3 corresponding to the first sensing electrode Y1 by using the first sensing electrode Y1. Here, after the drive signal having a characteristic of a continuous function (being differentiable) starts to be supplied to the third drive electrode X3, the detection unit 122 starts measurement after waiting a stabilization time. In the first period, the first operation time, the second operation time, and the third operation time do not overlap with each other. In some embodiments, when the third drive electrode X3 is driven, the drive unit 121 does not drive the other drive electrodes X1, X2, and X4 to Xn (does not supply the drive signal having a characteristic of a continuous function (being differentiable)).

Still furthermore, within a fourth operation time of the first period, the drive unit 121 transfers the drive signal having a characteristic of a continuous function (being differentiable) to a fourth drive electrode X4, and the detection unit 122 measures a capacitance value of the fourth drive electrode X4 corresponding to the first sensing electrode Y1 by using the first sensing electrode Y1. Here, after the drive signal having a characteristic of a continuous function (being differentiable) starts to be supplied to the fourth drive electrode X4, the detection unit 122 starts measurement after waiting a stabilization time. In the first period, the first operation time, the second operation time, the third operation time, and the fourth operation time do not overlap with each other. In some embodiments, when the fourth drive electrode X4 is driven, the drive unit 121 does not drive the other drive electrodes X1 to X3 and X5 to Xn (does not supply the drive signal having a characteristic of a continuous function (being differentiable)).

This process is repeated until all the drive electrodes X1 to Xn have been driven and capacitance values respectively corresponding to the first sensing electrode Y1 have been measured. In other words, the first period includes a plurality of operation times that do not overlap with each other. In the first period, the drive unit 121 supplies the drive signal having a characteristic of a continuous function (being differentiable) to each of the drive electrodes X1 to Xn within different operation times, and the detection unit 122 respectively measures capacitance values of the drive electrodes X1 to Xn respectively corresponding to the first sensing electrode Y1 within the different operation times by using the first sensing electrode Y1. The capacitance value may correspond to a touch sensing signal read by the signal processing circuit 12.

When the first period ends, the detection unit 122 has already respectively measured capacitance values of the drive electrodes X1 to Xn respectively corresponding to the first sensing electrode Y1 by using the first sensing electrode Y1 and output the measured capacitance values to the control unit 123. Subsequently, the detection unit 122 electrically connects the first sensing electrode Y1 to a second voltage (for example, a ground voltage) lower than the first voltage, to discharge the first sensing electrode Y1. Then, the detection unit 122 charges a second sensing electrode Y2 to the first voltage, and keeps a voltage of the second sensing electrode Y2 at the first voltage within a second period. In this case, the other sensing electrodes Y1 and Y3 to Ym are in a floating state.

Moreover, within the second period, the control unit 123 performs a scanning operation (referred to as a second scanning operation below) based on the second sensing electrode Y2 having the first voltage. The second period is later than the first period, and the first period and the second period do not overlap with each other.

In the process of performing the second scanning operation, within a first operation time of the second period, the drive unit 121 transfers the drive signal having a characteristic of a continuous function (being differentiable) to the first drive electrode X1, and the detection unit 122 measures a capacitance value of the first drive electrode X1 corresponding to the second sensing electrode Y2 by using the second sensing electrode Y2. Here, after the drive signal having a characteristic of a continuous function (being differentiable) starts to be supplied to the first drive electrode X1, the detection unit 122 starts measurements after waiting a stabilization time. In some embodiments, when the first drive electrode X1 is driven, the drive unit 121 does not drive the other drive electrodes X2 to Xn (does not supply the drive signal having a characteristic of a continuous function (being differentiable)).

Further, within a second operation time of the second period, the drive unit 121 transfers the drive signal having a characteristic of a continuous function (being differentiable) to the second drive electrode X2, and the detection unit 122 measures a capacitance value of the second drive electrode X2 corresponding to the second sensing electrode Y2 by using the second sensing electrode Y2. Here, after the drive signal having a characteristic of a continuous function (being differentiable) starts to be supplied to the second drive electrode X2, the detection unit 122 starts measurement after waiting a stabilization time. In the second period, the first operation time and the second operation time do not overlap with each other. In some embodiments, when the second drive electrode X2 is driven, the drive unit 121 does not drive the other drive electrodes X1 and X3 to Xn (does not supply the drive signal having a characteristic of a continuous function (being differentiable)).

Furthermore, within a third operation time of the second period, the drive unit 121 transfers the drive signal having a characteristic of a continuous function (being differentiable) to the third drive electrode X3, and the detection unit 122 measures a capacitance value of the third drive electrode X3 corresponding to the second sensing electrode Y2 by using the second sensing electrode Y2. Here, after the drive signal having a characteristic of a continuous function (being differentiable) starts to be supplied to the third drive electrode X3, the detection unit 122 starts measurement after waiting a stabilization time. In the second period, the first operation time, the second operation time, and the third operation time do not overlap with each other. In some embodiments, when the third drive electrode X3 is driven, the drive unit 121 does not drive the other drive electrodes X1, X2, and X4 to Xn (does not supply the drive signal having a characteristic of a continuous function (being differentiable)).

This process is repeated until all the drive electrodes X1 to Xn have been driven and capacitance values respectively corresponding to the second sensing electrode Y2 have been measured. In other words, the second period includes a plurality of operation times that do not overlap with each other. In the second period, the drive unit 121 supplies the drive signal having a characteristic of a continuous function (being differentiable) to each of the drive electrodes X1 to Xn within different operation times, and the detection unit 122 respectively measures capacitance values of the drive electrodes X1 to Xn respectively corresponding to the second sensing electrode Y2 within the different operation times by using the second sensing electrode Y2. The capacitance value may correspond to a touch sensing signal read by the signal processing circuit 12.

When the second period ends, the detection unit 122 has already respectively measured capacitance values of the drive electrodes X1 to Xn respectively corresponding to the second sensing electrode Y2 by using the second sensing electrode Y2 and output the measured capacitance values to the control unit 123. Subsequently, the detection unit 122 electrically connects the second sensing electrode Y2 to a second voltage (for example, a ground voltage) lower than the first voltage, to discharge the second sensing electrode Y2. Then, the detection unit 122 charges a third sensing electrode Y3 to the first voltage, and keeps a voltage of the third sensing electrode Y3 at the first voltage within a third period. In this case, the other sensing electrodes Y1, Y2, and Y4 to Ym are in a floating state.

Moreover, within the third period, the control unit 123 performs a scanning operation (referred to as a third scanning operation below) based on the third sensing electrode Y3 having the first voltage. The third period is later than the second period, and the third period and the second period do not overlap with each other.

In the process of performing the third scanning operation, within a first operation time of the third period, the drive unit 121 transfers the drive signal having a characteristic of a continuous function (being differentiable) to the first drive electrode X1, and the detection unit 122 measures a capacitance value of the first drive electrode X1 corresponding to the third sensing electrode Y3 by using the third sensing electrode Y3. Here, after the drive signal having a characteristic of a continuous function (being differentiable) starts to be supplied to the first drive electrode X1, the detection unit 122 starts measurement after waiting a stabilization time. In some embodiments, when the first drive electrode X1 is driven, the drive unit 121 does not drive the other drive electrodes X2 to Xn (does not supply the drive signal having a characteristic of a continuous function (being differentiable)).

Further, within a second operation time of the third period, the drive unit 121 transfers the drive signal having a characteristic of a continuous function (being differentiable) to the second drive electrode X2, and the detection unit 122 measures a capacitance value of the second drive electrode X2 corresponding to the third sensing electrode Y3 by using the third sensing electrode Y3. Here, after the drive signal having a characteristic of a continuous function (being differentiable) starts to be supplied to the second drive electrode X2, the detection unit 122 starts measurement after waiting a stabilization time. In the third period, the first operation time and the second operation time do not overlap with each other. In some embodiments, when the second drive electrode X2 is driven, the drive unit 121 does not drive the other drive electrodes X1 and X3 to Xn (does not supply the drive signal having a characteristic of a continuous function (being differentiable)).

Furthermore, within a third operation time of the third period, the drive unit 121 transfers the drive signal having a characteristic of a continuous function (being differentiable) to the third drive electrode X3, and the detection unit 122 measures a capacitance value of the third drive electrode X3 corresponding to the third sensing electrode Y3 by using the third sensing electrode Y3. Here, after the drive signal having a characteristic of a continuous function (being differentiable) starts to be supplied to the third drive electrode X3, the detection unit 122 starts measurement after waiting a stabilization time. In the third period, the first operation time, the second operation time, and the third operation time do not overlap with each other. In some embodiments, when the third drive electrode X3 is driven, the drive unit 121 does not drive the other drive electrodes X1, X2, and X4 to Xn (does not supply the drive signal having a characteristic of a continuous function (being differentiable)).

This process is repeated until all the drive electrodes X1 to Xn have been driven and the capacitance values respectively corresponding to the third sensing electrode Y3 have been measured. In other words, the third period includes a plurality of operation times that do not overlap with each other. In the third period, the drive unit 121 supplies the drive signal having a characteristic of a continuous function (being differentiable) to each of the drive electrodes X1 to Xn in different operation times, and the detection unit 122 respectively measures capacitance values of the drive electrodes X1 to Xn respectively corresponding to the third sensing electrode Y3 within the different operation times by using the third sensing electrode Y3. The capacitance value may correspond to a touch sensing signal read by the signal processing circuit 12.

When the third period ends, the detection unit 122 has already respectively measured capacitance values of the drive electrodes X1 to Xn respectively corresponding to the third sensing electrode Y3 by using the third sensing electrode Y3 and output the measured capacitance values to the control unit 123.

Subsequently, the detection unit 122 electrically connects the third sensing electrode Y3 to a second voltage (for example, a ground voltage) lower than the first voltage, to discharge the third sensing electrode Y3. This process is repeated, and initial stabilization of a next sensing electrode and a scanning operation based on the initially stabilized sensing electrode are subsequently performed, until all sensing electrodes have been initially stabilized and undergone the scanning operation.

In some embodiments, after each sensing electrode Yj is initially stabilized (charged to the first voltage) once, the control unit 123 may perform the scanning operation a plurality of times based on the initially stabilized sensing electrode Yj, to obtain a plurality of capacitance values of each of the n sensing points P(1, j) to P(n, j). Then, the control unit 123 controls the detection unit 122 to initially stabilize a next sensing electrode Yj and measure capacitance values of corresponding n sensing points.

Based on the foregoing operations, after each sensing electrode Yj is initially stabilized (charged to the first voltage) once, the signal processing circuit 12 scans all drive electrodes (for example, sequentially supplies the drive signal having a characteristic of a continuous function (being differentiable) to the drive electrodes X1 to Xn and measures the initially stabilized sensing electrode Yj), to obtain capacitive values of sensing capacitors formed respectively of all the drive electrodes X1 to Xn with the sensing electrode Yj, thereby reducing the number of times that a sensing electrode is initially stabilized, so that the time for compatibility and/or stabilization is further reduced and the sensing speed is increased. Therefore, by using the common input read method of an array signal described according to the embodiments of the present invention, the touch sensing apparatus can efficiently sense a touch sensing signal (that is, the foregoing capacitance value).

In some embodiments, the signal processing circuit 12 may be implemented by one or more chips. In addition, a storage unit may be built in and/or externally connected to the control unit 123 to store related software/firmware programs, data, parameters, a combination thereof, and the like. Moreover, the storage unit may be implemented by one or more memories.

In conclusion, the touch sensing apparatus and the common input read method of an array signal according to the embodiments of the present invention are applicable to the touch sensing apparatus using a drive signal having a characteristic of a continuous function (being differentiable) as a touch basis. Any sensing electrode initially first undergoes a stabilization process till a signal becomes stable and indicates completion, an initially stabilized same sensing electrode is then read according to a selection order of drive electrodes, and an initial stabilization action only needs to be performed when a sensing electrode that is not currently processed needs to be processed. In this way, the time it takes to enter a steady state is reduced, so that the sensing speed is further increased. Therefore, a sensing electrode and a drive electrode can be efficiently scanned, and the touch efficiency performance of the touch sensing apparatus is further improved.

What is claimed is:

1. A common input read method of an array signal, comprising:
   initially stabilizing a first sensing electrode within a first period;
   performing a first scanning operation within the first period, wherein a performing step of the first scanning operation comprises:
      driving a first drive electrode within a first operation time of the first period, and measuring a capacitance value of the first sensing electrode corresponding to the driven first drive electrode by using the initially stabilized first sensing electrode; and
      driving a second drive electrode within a second operation time of the first period, and measuring a capacitance value of the first sensing electrode corresponding to the driven second drive electrode by using the initially stabilized first sensing electrode;
   initially stabilizing a second sensing electrode within a second period after the first period; and
   performing a second scanning operation within the second period, wherein the performing step of the second scanning operation comprises:
      driving the first drive electrode within a first operation time of the second period, and measuring a capacitance value of the second sensing electrode corresponding to the driven first drive electrode by using the initially stabilized second sensing electrode; and
      driving the second drive electrode within a second operation time of the second period, and measuring a capacitance value of the second sensing electrode corresponding to the driven second drive electrode by using the initially stabilized second sensing electrode.

2. The common input read method of an array signal according to claim 1, wherein the initially stabilizing step of the first sensing electrode or the second sensing electrode comprises: keeping the sensing electrode at a first voltage.

3. The common input read method of an array signal according to claim 1, wherein the driving step of the first drive electrode or the second drive electrode comprises: transferring a drive signal having a characteristic of a continuous function to the drive electrode.

4. The common input read method of an array signal according to claim 1, further comprising:
   keeping sensing electrodes other than the first sensing electrode in a floating state within the first period; and
   keeping sensing electrodes other than the second sensing electrode in a floating state within the second period.

5. A touch sensing apparatus, comprising:
   a first sensing electrode;
   a second sensing electrode;
   a first drive electrode;
   a second drive electrode; and
   a signal processing circuit, coupled to the first sensing electrode, the second sensing electrode, the first drive electrode, and the second drive electrode, wherein the signal processing circuit is configured to perform:
   initially stabilizing the first sensing electrode within a first period;
   performing a first scanning operation within the first period, wherein a performing step of the first scanning operation comprises:
      driving the first drive electrode within a first operation time of the first period by using a drive signal having a characteristic of a continuous function, and measuring a capacitance value of the first sensing electrode corresponding to the driven first drive electrode by using the initially stabilized first sensing electrode; and
      driving the second drive electrode within a second operation time of the first period by using the drive signal having a continuous function characteristic, and measuring a capacitance value of the first sensing electrode corresponding to the driven second drive electrode by using the initially stabilized first sensing electrode;
   initially stabilizing the second sensing electrode within a second period after the first period; and
   performing a second scanning operation within the second period, wherein the performing step of the second scanning operation comprises:
      driving the first drive electrode within a first operation time of the second period by using the drive signal having a continuous function characteristic, and measuring a capacitance value of the second sensing electrode corresponding to the driven first drive electrode by using the initially stabilized second sensing electrode; and
      driving the second drive electrode within a second operation time of the second period by using the drive signal having a continuous function characteristic, and measuring a capacitance value of the second sensing electrode corresponding to the driven second drive electrode by using the initially stabilized second sensing electrode.

* * * * *